(12) United States Patent  (10) Patent No.: US 8,876,110 B2
Hoffman et al.  (45) Date of Patent: Nov. 4, 2014

(54) CREDENTIAL MANUFACTURING DEVICE SUBSTRATE SHUTTLE

(75) Inventors: Ted M. Hoffman, Eden Prairie, MN (US); Philip G. Umberger, Jordan, MN (US)

(73) Assignee: Assa Abloy AB, Stockholm (SE)

( * ) Notice: Subject to any disclaimer, the term of this patent is extended or adjusted under 35 U.S.C. 154(b) by 182 days.

(21) Appl. No.: 13/293,595

(22) Filed: Nov. 10, 2011

(65) Prior Publication Data

US 2013/0121793 A1    May 16, 2013

(51) Int. Cl.
G06K 5/00       (2006.01)
B65H 5/04       (2006.01)
G06K 17/00      (2006.01)
G06K 13/07      (2006.01)
B65H 15/00      (2006.01)
B65H 3/44       (2006.01)

(52) U.S. Cl.
CPC  *B65H 5/04* (2013.01); *G06K 17/00* (2013.01); *G06K 13/07* (2013.01); *B65H 2301/341* (2013.01); *B65H 2301/34112* (2013.01); *B65H 2701/1914* (2013.01); *B65H 15/00* (2013.01); *B65H 2402/32* (2013.01); *B65H 2403/52* (2013.01); *B65H 2405/3311* (2013.01); *B65H 3/44* (2013.01)
USPC .......... 271/296; 271/302; 271/184; 271/9.01; 235/379; 235/380

(58) Field of Classification Search
CPC ............................. G06K 13/07; G06K 17/00
USPC .............. 271/296, 300, 302, 272–274, 9.01, 271/9.11, 9.05; 235/379, 380
See application file for complete search history.

(56) References Cited

U.S. PATENT DOCUMENTS 4,017,004 A * 4/1977 Onoe et al. ...................... 221/94
4,872,660 A   10/1989 Kameyama et al.
4,884,698 A * 12/1989 Tutamune et al. ............ 209/534
5,076,562 A   12/1991 Sai et al.
5,145,160 A    9/1992 Nagashima et al.
(Continued)

FOREIGN PATENT DOCUMENTS

JP   2000226126   8/2000
JP   2003223038   8/2003
JP   2003223039   8/2003

OTHER PUBLICATIONS

Extended European Search Report for EP 12191115.0, dated Jun. 2, 2014.

*Primary Examiner* — Luis A Gonzalez
(74) *Attorney, Agent, or Firm* — Westman, Champlin & Koehler P.A.

(57) ABSTRACT

One embodiment of a credential manufacturing device comprises a first hopper, a first processing path, a first processing device, a substrate shuttle and a shuttle drive. The first hopper is configured to contain a plurality of card substrates and includes an output port. The first processing device is in the first processing path and is configured to perform a first process on individual card substrates in the first processing path. The substrate shuttle is positioned between the first hopper and the first processing path and is configured to receive individual card substrates from the output port of the first hopper, transport received card substrates along a shuttle path, and deliver received card substrates to the first processing path. The shuttle drive is configured to drive movement of the substrate shuttle along the shuttle path.

25 Claims, 14 Drawing Sheets

(56) References Cited

U.S. PATENT DOCUMENTS

| | | | |
|---|---|---|---|
| 5,156,385 A | 10/1992 | Muto et al. | |
| 5,299,796 A | 4/1994 | Wooldridge | |
| 5,326,093 A * | 7/1994 | Sollitt | 271/306 |
| 5,382,012 A * | 1/1995 | Mandel et al. | 270/58.14 |
| 6,027,020 A | 2/2000 | Meyer-Wittreck et al. | |
| 6,176,424 B1 * | 1/2001 | Meyer-Wittreck et al. | 235/381 |
| 6,334,611 B1 * | 1/2002 | Koo | 271/296 |
| 6,431,537 B1 | 8/2002 | Meier | |
| 6,722,649 B2 * | 4/2004 | Yui | 271/184 |
| 6,957,746 B2 * | 10/2005 | Martin et al. | 221/131 |
| 7,878,505 B2 | 2/2011 | Meier et al. | |
| 7,922,173 B2 * | 4/2011 | Stapfer | 271/272 |
| 7,931,270 B2 * | 4/2011 | Kirschbauer et al. | 271/184 |
| 2003/0155370 A1 | 8/2003 | Martin et al. | |
| 2007/0023992 A1 | 2/2007 | Ohta et al. | |
| 2010/0028107 A1 * | 2/2010 | Dobler et al. | 414/222.07 |

* cited by examiner

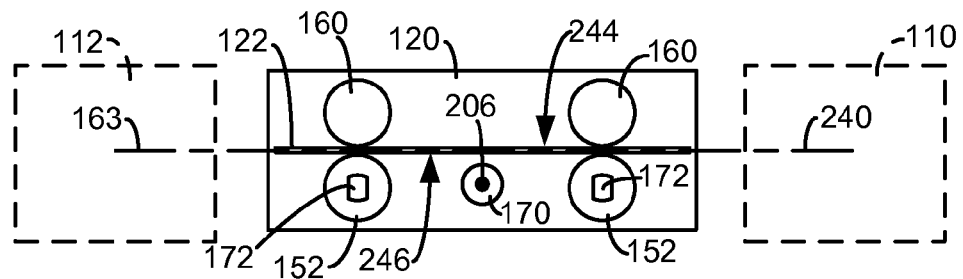
FIG. 20A
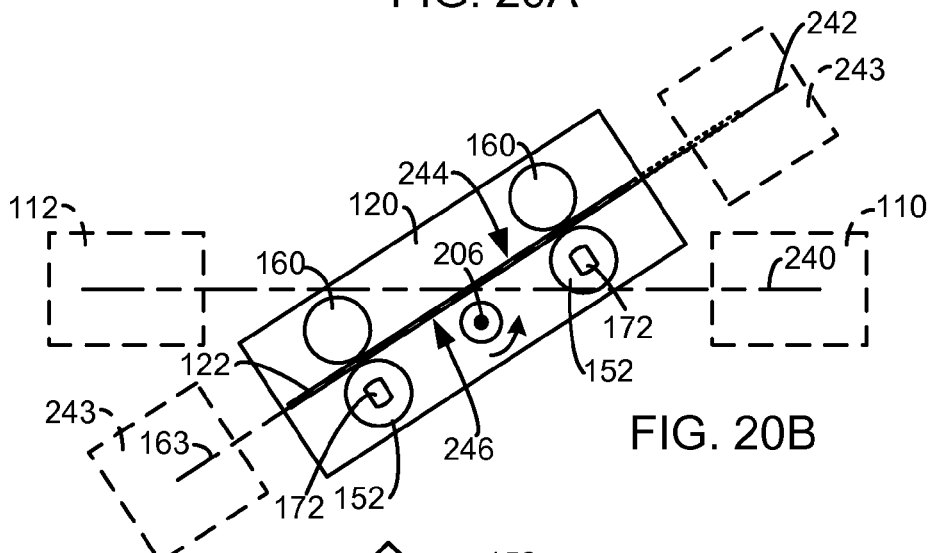
FIG. 20B
FIG. 20C
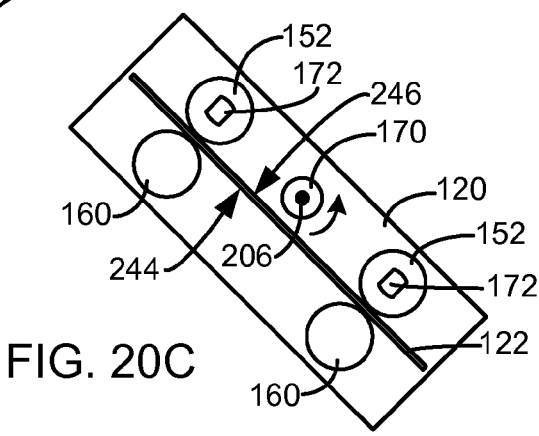
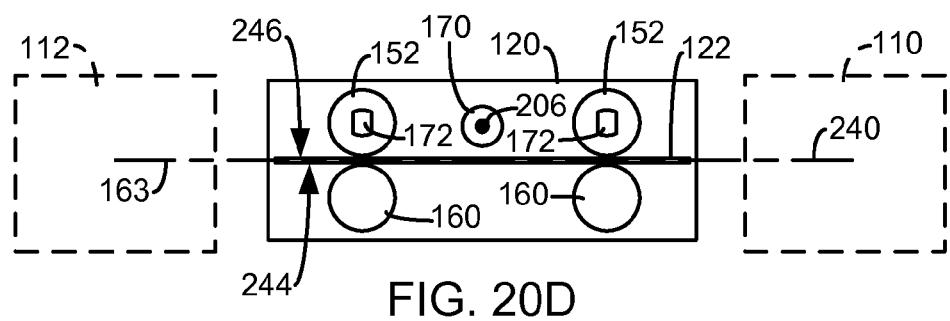
FIG. 20D

CREDENTIAL MANUFACTURING DEVICE SUBSTRATE SHUTTLE

BACKGROUND

Credentials include identification cards, driver's licenses, passports, and other documents. Such credentials are formed from credential or card substrates including paper substrates, plastic substrates, card substrates and other materials. Such credentials generally include printed information, such as a photo, account numbers, identification numbers, and other personal information. A secure overlaminate may also be laminated to the surfaces of the credential substrate to protect the surfaces from damage and, in some instances, provide a security feature (e.g., hologram). Additionally, credentials can include data that is encoded in a smartcard chip, a magnetic stripe, or a barcode, for example.

Such credentials are generally formed by performing one or more processes on card substrates. These processes include, for example, a printing process, a laminating process, a data reading process, a data writing process, or other process, on one, or both sides of the card substrate. Additionally, it may be desirable to perform such processes on different types of card substrates.

SUMMARY

Embodiments of the invention are directed to a credential manufacturing device that may be configured to have one or more hoppers containing card substrates and one or more processing devices configured to perform a process on individual substrates. Additionally, the credential manufacturing device includes a substrate shuttle that is configured to receive individual substrates from the one or more hoppers and transport the substrates to one or more processing paths corresponding to the one or more processing devices.

In one exemplary embodiment, the credential manufacturing device comprises a first hopper, a first processing path, a first processing device, a substrate shuttle and a shuttle drive. The first hopper is configured to contain a plurality of card substrates and includes an output port through which individual card substrates are discharged. The first processing device is in the first processing path and is configured to perform a first process on individual card substrates in the first processing path. The substrate shuttle is positioned between the first hopper and the first processing path and is configured to move relative to the first hopper and the first processing path along a horizontal shuttle path that is transverse to the first processing path. The shuttle is configured to receive individual card substrates from the output port of the first hopper, transport received card substrates along the shuttle path, and deliver received card substrates to the first processing path. The shuttle drive is configured to drive movement of the substrate shuttle along the shuttle path.

Another embodiment of the credential manufacturing device comprises a plurality of hoppers, a plurality of processing paths, a plurality of processing devices, a substrate shuttle and a shuttle drive. The plurality of hoppers are each configured to contain a plurality of card substrates and include an output port through which individual card substrates are discharged. Each of the plurality of processing paths extends substantially parallel to the other processing paths and is displaced from the other processing paths along a horizontal shuttle path that is transverse to the processing paths. Each of the plurality of processing devices is located in one of the processing paths and is configured to perform a process on individual card substrates in the corresponding processing path. The substrate shuttle is positioned between the hoppers and the processing paths and is configured to receive individual card substrates from the output ports of the hoppers, transport received card substrates along the shuttle path, and deliver received card substrates to the processing paths. The shuttle drive is configured to drive movement of the substrate shuttle along the shuttle path.

In one embodiment, the substrate shuttle does not support any electronic components, such as a motor or a sensor.

In one embodiment, the substrate shuttle comprises a drive component and the shuttle drive comprises a screw that is aligned with the shuttle path and engages the drive component. The shuttle drive also includes a shuttle transport motor that is located externally to the substrate shuttle and is configured to drive rotation of the screw. The substrate shuttle is driven along the screw and the shuttle path responsive to rotation of the screw.

In one embodiment, the substrate shuttle comprises substrate feed rollers that are supported on the substrate shuttle for rotation about an axis that is substantially parallel to the shuttle path. The shuttle drive comprises a substrate feed motor located externally to the substrate shuttle. The substrate feed motor is configured to drive rotation of at least one of the feed rollers.

In one embodiment, the shuttle drive includes a drive shaft that extends substantially parallel to the shuttle path. At least one of the feed rollers is linked to the drive shaft. The substrate feed motor is configured to drive rotation of the drive shaft and the linked feed roller, and drive individual substrates along a substrate path that extends substantially parallel to the processing path and through the substrate shuttle.

In one embodiment, the substrate shuttle comprises a hub that receives the drive shaft, slides along the drive shaft responsive to movement of the substrate shuttle along the shuttle path, rotates with rotation of the drive shaft, and links the drive shaft to the at least one feed roller.

In one embodiment, the credential manufacturing device comprises a radio frequency (RF) data writer positioned adjacent the shuttle path. The RF data writer is configured to perform a data read or write operation on an individual card substrate received within the substrate shuttle and positioned along the shuttle path adjacent the RF data writer.

Embodiments of the invention are also directed to a method. In one embodiment of the method, a credential manufacturing device is provided. In one embodiment, the provided credential manufacturing device comprises a plurality of hoppers, a plurality of processing paths, a plurality of processing devices, a substrate shuttle and a shuttle drive. Each processing path extends substantially parallel to the other processing paths and is displaced from the other processing paths along a horizontal shuttle path that is transverse to the processing paths. Each of the processing devices is located in one of the processing paths and is configured to perform a process on individual card substrates in the corresponding processing path. Also in the method, the substrate shuttle is aligned with a first one of the hoppers (first hopper) comprising moving the substrate shuttle along the shuttle path. A card substrate is then fed through an output port of the first hopper and into the substrate shuttle. The substrate shuttle is then moved along the shuttle path using the shuttle drive to a first one of the processing paths (first path). The card substrate is then fed from the substrate shuttle along the first path. The card substrate is then processed using the processing device in the first path.

In one embodiment of the method, the processed card substrate is fed along the first path and into the substrate shuttle. The substrate shuttle is then aligned with a second one of the processing paths (second path) comprising moving the substrate shuttle along the substrate path using the shuttle drive. The card substrate is then fed from the substrate shuttle along the second path. The card substrate is then processed using the processing device in the second path.

In one embodiment of the method, the credential manufacturing device further comprises a radio frequency (RF) data writer positioned adjacent the substrate path. In the method, the processed card substrate is fed into the substrate shuttle. The substrate shuttle is then aligned with the RF data writer comprising moving the substrate shuttle along the substrate path using the shuttle drive. A data reading or writing operation is then performed on the card substrate using the RF data writer.

In one embodiment, the credential manufacturing device includes a shuttle rotator that comprises a support member and a motor. The support member is configured to rotate about a shuttle rotation axis that is parallel to the shuttle path. The motor is configured to drive the rotation of the support member about the shuttle rotation axis. The substrate shuttle rotates about the shuttle rotation axis responsive to rotation of the support member.

Other features and benefits that characterize embodiments of the invention will be apparent upon reading the following detailed description and review of the associated drawings.

BRIEF DESCRIPTION OF THE DRAWINGS

FIGS. 20A-D are simplified diagrams illustrating the rotation of a substrate shuttle in accordance with embodiments of the invention.

DETAILED DESCRIPTION OF ILLUSTRATIVE EMBODIMENTS

Embodiments of the invention are directed to a credential manufacturing device that includes a substrate shuttle that is configured to receive individual substrates from one or more substrate hoppers or cartridges and/or deliver the individual substrates to one or more processing paths, along which a process may be performed on the substrate to create the desired credential. In one embodiment, the substrate shuttle does not include any electronic components, such as sensors or motors.

Figure 1:
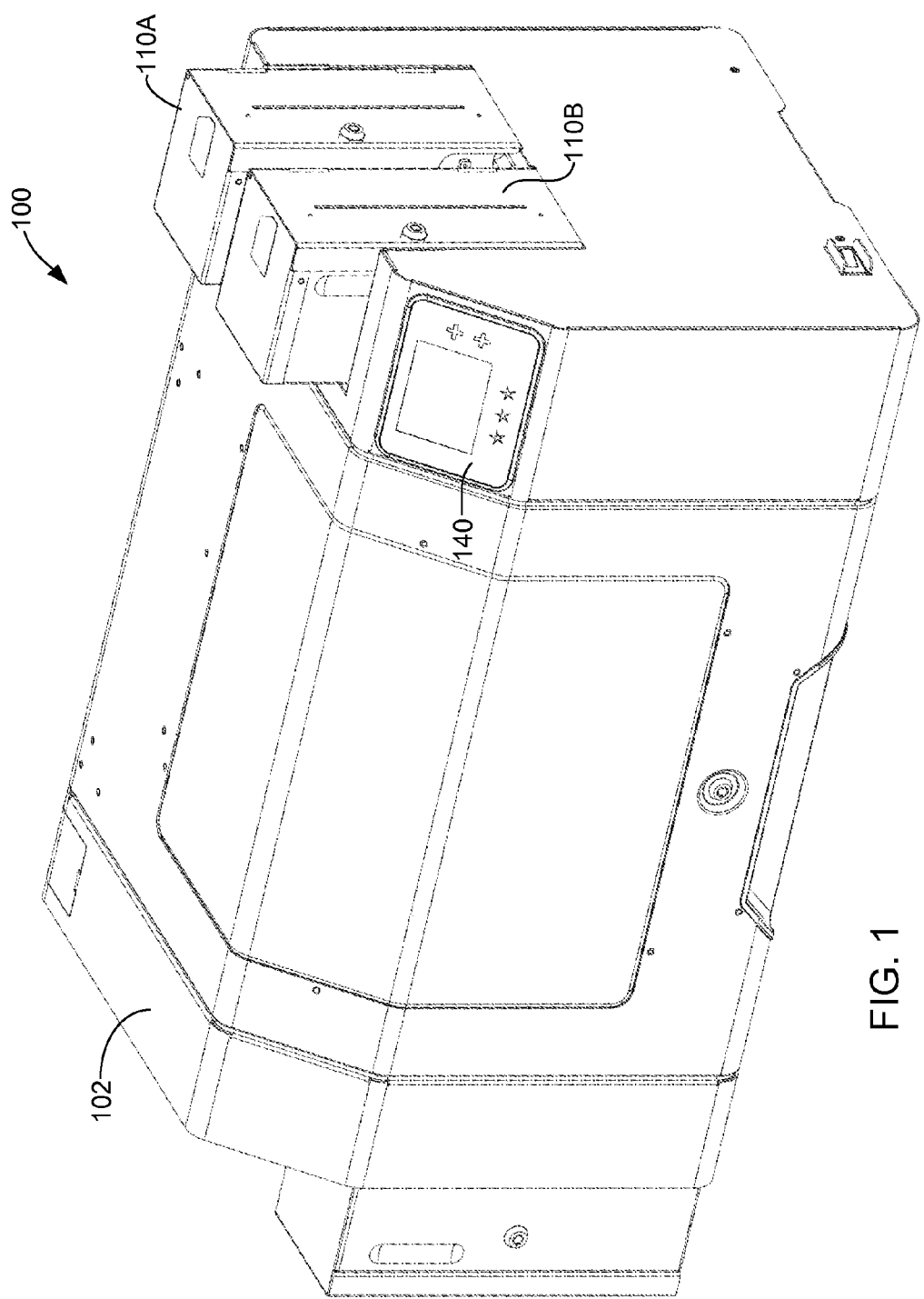
FIG. 1 is an isometric view of a credential manufacturing device formed in accordance with embodiments of the invention.
Figure 2:
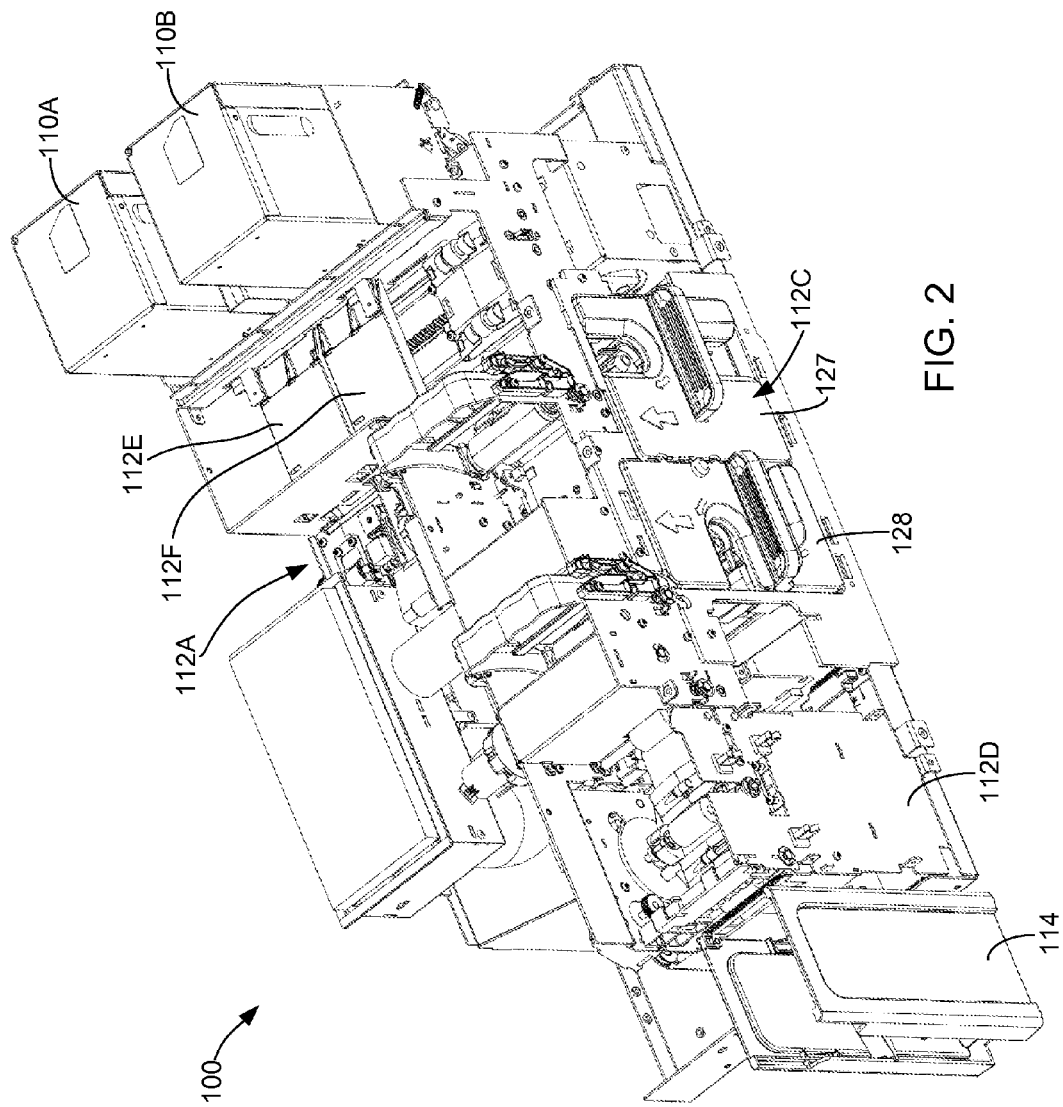
FIG. 2 is an isometric view of the credential manufacturing device of FIG. 1 with the housing removed.
Figure 3:
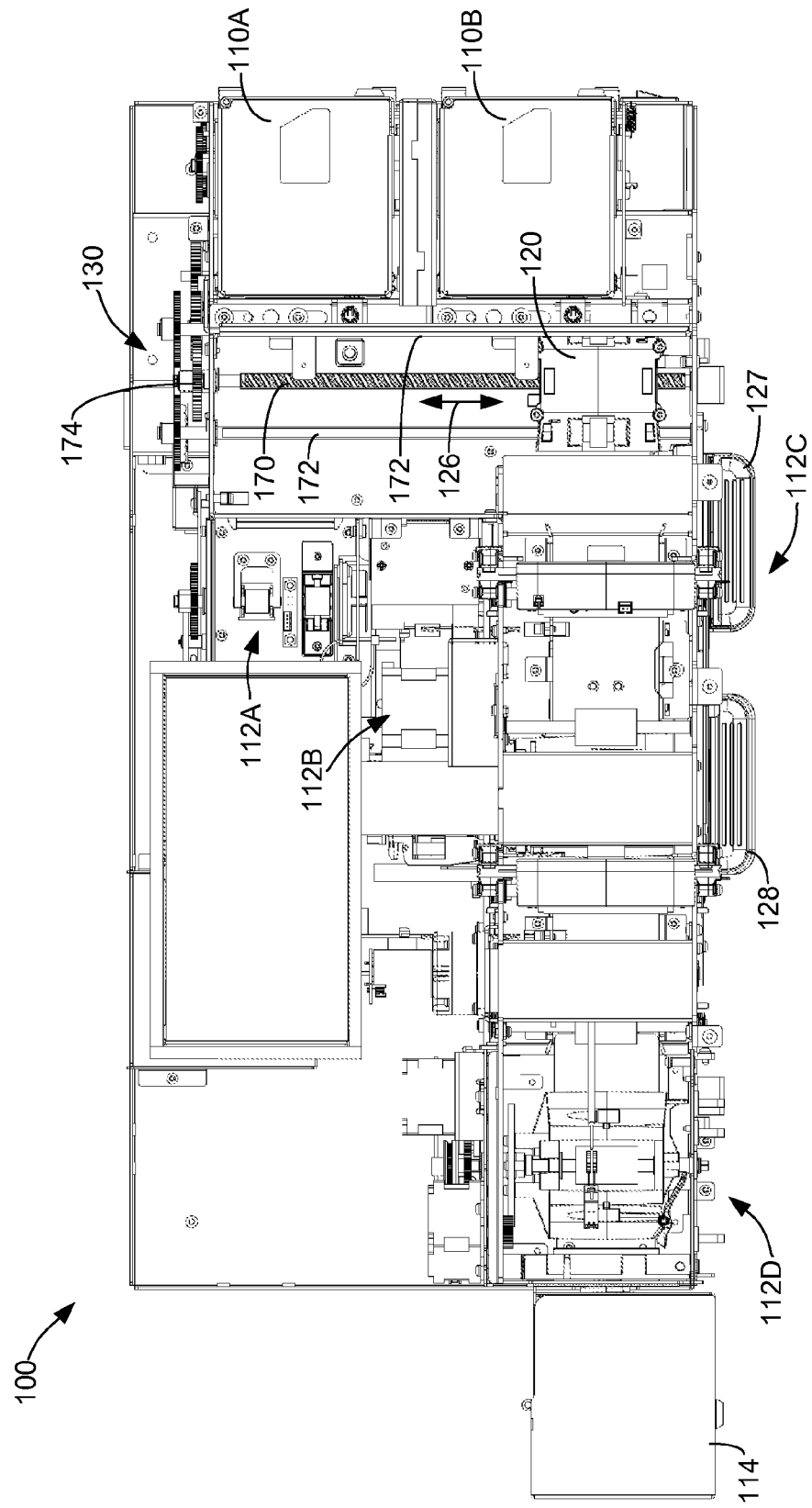
FIG. 3 is a top view of the device of FIG. 2 with components removed to illustrate certain features.

FIG. 1 is an isometric view of a credential manufacturing device 100 formed in accordance with embodiments of the invention. FIG. 2 is an isometric view of the credential manufacturing device 100 with the housing 102 removed to illustrate the internal components of the device 100. FIG. 3 is a top view of the device of FIG. 2 with a couple of components removed to illustrate certain features. Reference will also be made to FIGS. 4-9, which are simplified top views of a credential manufacturing device 100 formed in accordance with embodiments of the invention. Elements having the same or similar labels generally correspond to the same or similar elements.

Embodiments of the credential manufacturing device 100 include one or more substrate hoppers 110, one or more card processing devices 112, and/or one or more output hoppers 114. The device also includes a substrate shuttle 120, which is configured to deliver individual card substrates 122 from the one or more hoppers 110 to the one or more processing devices 112.

The one or more substrate hoppers 110, such as substrate hopper 110A and substrate hopper 110B, are configured to contain or support one or more card substrates 122. The substrate hopper 110 may be in the form of a cartridge that contains a stack of the substrates 122 and is removably installed on the device 100, or the hopper 110 may be a container that is attached to the device 100 and receives a stack of the substrates 122. Each of the hoppers 110 includes an output port, through which individual card substrates are discharged.

As used herein, "card substrate" describes substrates used to form credentials, such as identification cards, driver's licenses, passports, credit or debit cards, phone cards, security cards, gift cards, etc. Exemplary card substrates include paper substrates other than traditional paper sheets used in copiers or paper sheet printers, plastic substrates, rigid and semi-rigid card substrates and other similar materials.

Embodiments of the one or more processing devices 112 include conventional devices used to perform at least one process on individual substrates 122 to form a desired credential. In one embodiment, at least one of the processing devices 112 is aligned with a processing path 124, which is generally parallel to a processing axis. Each of the processing devices 112 is configured to perform a process on individual card substrates 122 that are fed along the corresponding processing path 124. For instance, the processing device 112A is configured to perform a process on the individual card substrates 122 that are fed along the processing path 124A, the processing device 112B is configured to perform a process on individual card substrates 122 fed along the processing path 124B, and the processing devices 112C and 112D are configured to perform a process on individual substrates 122 that are presented along the processing path 124C.

In one embodiment, the substrate shuttle 120 moves along a shuttle path 126, which is parallel to a shuttle axis and transverse to the one or more processing paths 124. In one embodiment, the device 100 includes one or more processing devices 112, such as processing devices 112E and 112F that are positioned in close proximity to the shuttle path 126 and are configured to perform a process on individual substrates 122 while the substrates 122 are supported by the substrate shuttle 120. These processing devices 112 may be located above, below or to the side of the shuttle path 126. The devices 112E and 112F are removed in FIGS. 3 and 5-8 in order to better illustrate the shuttle path 126.

In one exemplary embodiment, one or more of the processing devices 112, such as processing devices 112A and 112B, are data reading and/or writing devices (hereinafter "writers") that are used to read data from and/or write data to components of the substrates 122. Examples of suitable data writers include a magnetic stripe writer, a contact chip writer (i.e., smart card writer), a contactless chip writer, and other suitable data writers used to perform data writing and/or reading operations on card substrates used to form credentials. Thus, the credential manufacturing device 100 may include multiple data writers in order to perform data reading and/or writing operations on substrates 122 having different types of data storage. In one embodiment, the processing devices 112A and 112B comprise data writers that are configured to perform a data reading and/or writing operation on individual card substrates 122 that are respectively presented along the processing paths 124A and 124B.

In one embodiment, the credential manufacturing device 100 includes a printing section that includes at least one processing device 112 in the form of a printing device that is configured to print an image to a surface of individual substrates 122. Embodiments of the printing device 112 can be any suitable printing device conventionally used in credential manufacturing devices. For instance, the printing device 112 may be in the form of an inkjet or thermal print head that is configured to directly print an image onto a surface of a substrate 122. Alternatively, the printing device 112 may be in the form of a reverse-image transfer printing device that includes a print head that prints an image from a print ribbon, which may be provided in a print ribbon cartridge 127 (FIGS. 2 and 3), to a transfer film, which may be contained in a transfer ribbon cartridge 128 (FIGS. 2 and 3). The image on the transfer film is then transferred to the surface of the substrate 122 using a heated transfer roller. Other suitable printing devices 112 may also be used in the credential manufacturing device 100. In one exemplary embodiment, the processing device 112C comprises the printing device that is configured to print an image onto a surface of substrates 122 that are presented along the processing path 124C.

In one embodiment, the device 100 includes a processing device 112 in the form of a card substrate inverter that is configured to flip individual card substrates 122. This allows the device 100 to perform card substrate processing operations, such as printing operations, laminating operations, data reading or writing operations on both sides of the substrates 122. Embodiments of the card substrate inverter 112 include those described in international application number WO 2011/035114, which is hereby incorporated by reference in its entirety. In one embodiment, the processing device 112D comprises the card substrate inverter and is configured to flip individual card substrates presented along the processing path 124C. In this particular example, an individual substrate 122 fed along the processing path 124C may have an image applied to one surface by the printing device 112C. Subsequently, the substrate 122 may be fed along the processing path 124C to the card substrate inverter 112D, which flips the card 122 and feeds the card back along the processing path 124C to the printing device 112C. The printing device 112C can then print another image on the blank side of the substrate 122.

In one embodiment, one or more of the processing devices 112 are in the form of a laminator that is configured to laminate a film onto a surface of the substrate 122. Typically, this lamination process is performed on a surface of the substrate 122 that has received an image from the printing section to protect the image.

Figure 4:
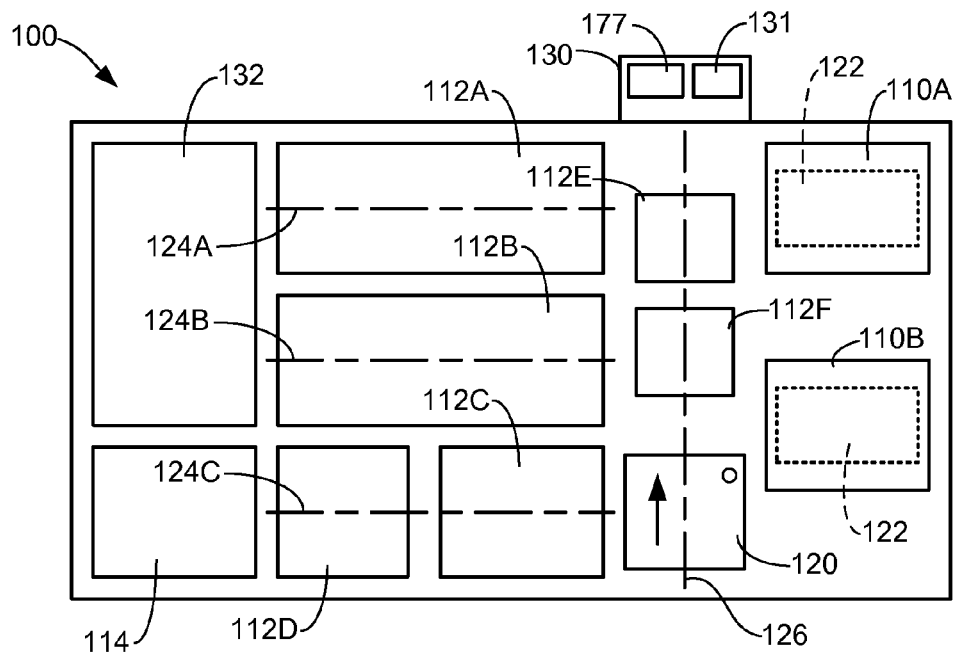
FIGS. 4-9 are simplified top views of the credential manufacturing device formed in accordance with embodiments of the invention.
Figure 5:
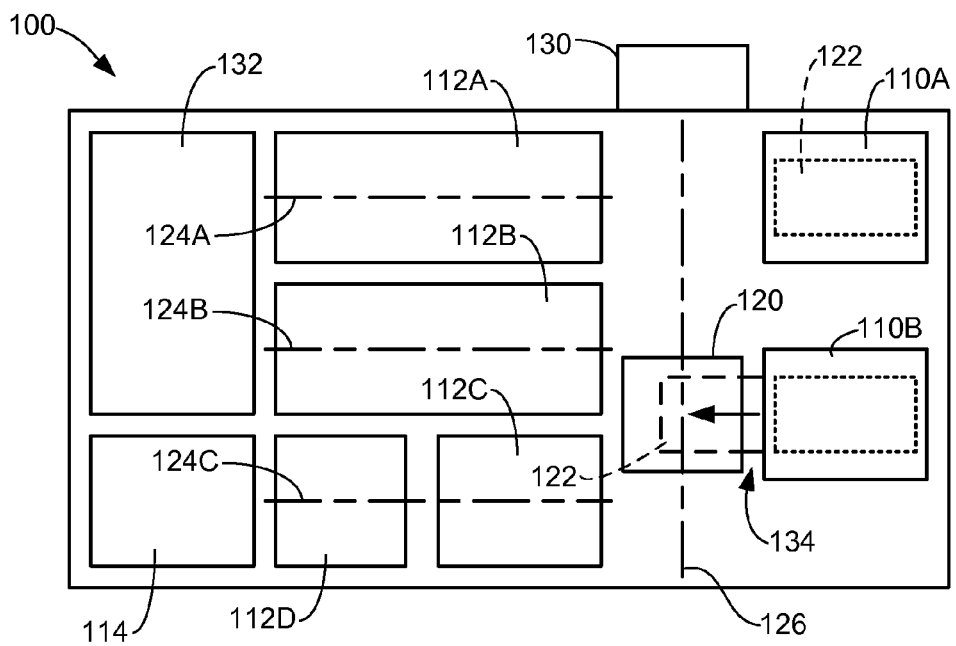

As mentioned above, embodiments of the credential manufacturing device 100 include one or more output hoppers 114. Each output hopper 114 is configured to collect processed card substrates 122. In one embodiment, the device 100 performs a verification process on substrates 122 that have been processed by the one or more devices 112 to determine whether there were any processing errors, such as data writing errors, printing errors, etc. Substrates 122 that are found to be properly processed are fed to one output hopper 114, while substrates having processing errors are fed to a reject output hopper 114. In one exemplary embodiment, an output hopper 114 is positioned in the processing path 124C, as shown in FIGS. 4 and 5. However, the one or more output hoppers 114 could be positioned along any of the processing paths 124 of the device 100. In accordance with other embodiments, the output hopper 114 may be positioned on the side of the substrate shuttle 120 where the input hoppers 110 are located.

Embodiments of the substrate shuttle 120 are configured to receive individual substrates 122 from the one or more hoppers 110 and deliver individual substrates along the shuttle path 126 to, for example, the one or more processing paths 124 for processing by one of the devices 112. As mentioned above, the substrate shuttle 120 may also deliver individual substrates 122 to the processing devices 112 located in the shuttle path 126, such as processing devices 112E and 112F, which are shown in FIGS. 2 and 4. In one embodiment, the substrate shuttle 120 includes a substrate feeding mechanism (e.g., feed roller) that is configured to drive individual substrates along a substrate path that extends substantially parallel to the one or more processing paths 124 and through the shuttle 120. Embodiments of the substrate feeding mechanism are described in greater detail below.

The substrate shuttle 120 is driven along the shuttle path 126 by a shuttle drive 130. The shuttle drive 130 includes a shuttle transport motor 131 that drives the motion of the substrate shuttle 120 along the shuttle path 126. In one embodiment, the motor 131 and other electronic components of the shuttle drive 130 are displaced from the substrate shuttle 120. That is, the substrate shuttle 120 does not support the motor or other electronics of the shuttle drive 130. In accordance with another embodiment, the substrate shuttle 120 does not support any electronics, such as motors and sensors. In addition to simplifying the operation of the substrate shuttle, the lack of electronic components on the substrate shuttle 120 reduces electronic interference that may occur during an RF data reading or writing operation on a substrate 122 that is supported in the substrate shuttle 120, such as by processing devices 112E or 112F, for example.

In one embodiment, the credential manufacturing device 100 includes a controller 132 that controls the operations of the device 100. Embodiments of the controller 132 represents tangible memory (i.e., RAM, ROM, etc.) for storing program instructions and one or more processors that are configured to execute the program instructions and cause the components of the device 100 to carry out the method steps described herein. In one embodiment, the controller 132 is configured to receive program instructions from a computer either directly or through a network using conventional communication protocols. In one embodiment, card processing jobs may be configured by a user on the computer, or the user may directly configure a credential processing job through an interface of the credential manufacturing device 100, such as through a control panel 140, shown in FIG. 1.

The credential job to be performed by the device 100 may be input by the user using the control panel 140 or generated by an application running on a computer (not shown) in communication with the device 100. In one embodiment, the credential job designates a type of credential substrate that is to be used, or the credential job identifies one of the hoppers 110, in which the desired credential substrate 122 is contained. Additionally, the credential job designates one or more processes that are to be performed on the credential substrate 122, such as printing processes, data writing processes, laminating processes, substrate flipping processes, and other processes that can be performed by the devices 112 of the credential manufacturing device 100. The controller 132 executes the instructions corresponding to the credential job to perform various method steps and produce the desired credential product.

The following are exemplary method steps that may be performed by the device 100 responsive to the execution of program instructions by the controller 132 to produce the desired credential. In one embodiment, the substrate shuttle 120 is initially located at a home position, such as at a far side of the shuttle path 126, as shown in FIG. 4. This home position may be detected by the controller 132 using a suitable sensor.

The substrate shuttle 120 is moved from the home position along the shuttle path 126, if necessary, to align the substrate shuttle 120 with one of the hoppers 110, as shown in FIG. 5. As mentioned above, the particular hopper 110 that the substrate shuttle 120 is aligned with may be identified in the credential job, or determined by the device 100 based on the type of substrate 122 identified in the credential job that is to be processed. For example, the credential job may designate a particular type of substrate 122 that is to be used to perform the credential product. The controller 132 can then determine which hopper 110 of the device 100 contains the desired substrate 122. Alternatively, the credential job may designate the hopper 110, from which the desired substrate 122 is to be retrieved. In the present example, the substrate shuttle 120 is aligned with the hopper 110B. This alignment of the substrate shuttle 120 with the desired hopper 110 may be accomplished using a suitable sensor, a count of a stepper motor 131 of the shuttle drive 130, or other technique.

After the controller 132 determines that the substrate shuttle 120 is aligned with the desired hopper 110, an individual substrate 122 is fed through the output port 134 of the hopper 110 and into the substrate shuttle 120, as illustrated in FIG. 5. The feeding of the substrate 122 from the hopper 110 may be achieved using conventional substrate feeding mechanisms, such as feed rollers. As described below in greater detail, one embodiment of the substrate shuttle 120 includes substrate feed rollers that are configured to drive movement of a received substrate 122 relative to the substrate shuttle 120 in a direction that is transverse or perpendicular to the shuttle path 126. These substrate feed rollers may be used to position the received substrate 122 as desired within the substrate shuttle 120 and to discharge substrates 122 from the shuttle 120.

Figure 6:
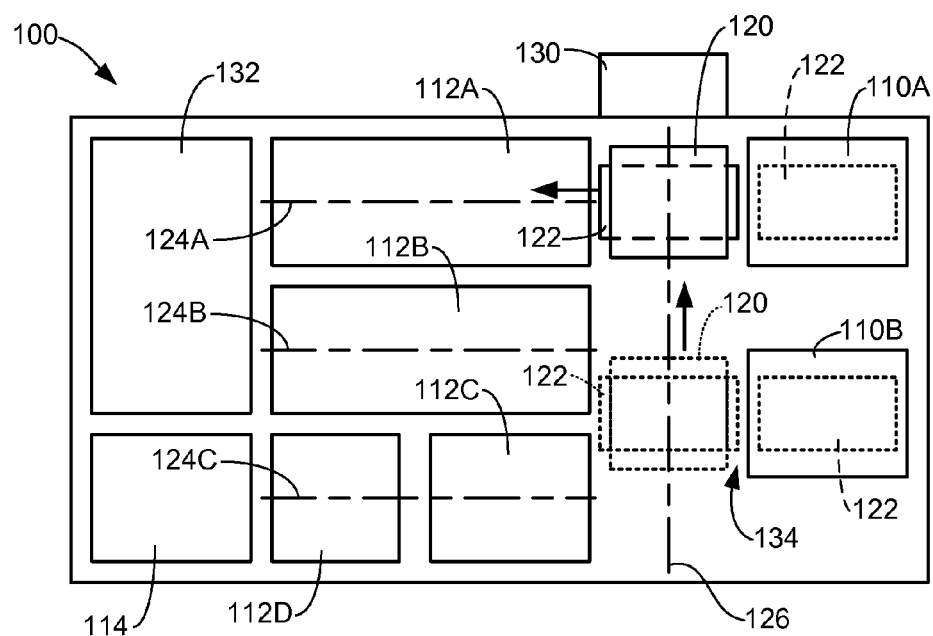

In one embodiment, after the substrate 122 is fully received within the substrate shuttle 120 (illustrated in phantom lines), the substrate shuttle 120 delivers the substrate 122 along the shuttle path 126 to the desired processing path 124, as shown in FIG. 6. The substrate 122 is then discharged to the selected processing path 124 and is received by either the corresponding processing device 112, or is received by a suitable substrate transport mechanism (e.g., feed rollers) to feed the substrate 122 along the processing path 124. In the exemplary embodiment illustrated in FIG. 6, the substrate 122 is delivered to the processing path 124A and the processing device 112A performs a process on the substrate. When the processing device 112A is in the form of a data writer, the device 112A performs the desired data writing process on the substrate 122. As mentioned above, this data writing process may involve reading and/or writing data to memory supported on the substrate 122, reading and/or writing data to a magnetic stripe on the substrate 122, or other data reading and/or writing operation on the substrate 122. The substrate 122 is then discharged from the processing path 124A back into the waiting substrate shuttle 120.

Figure 7:
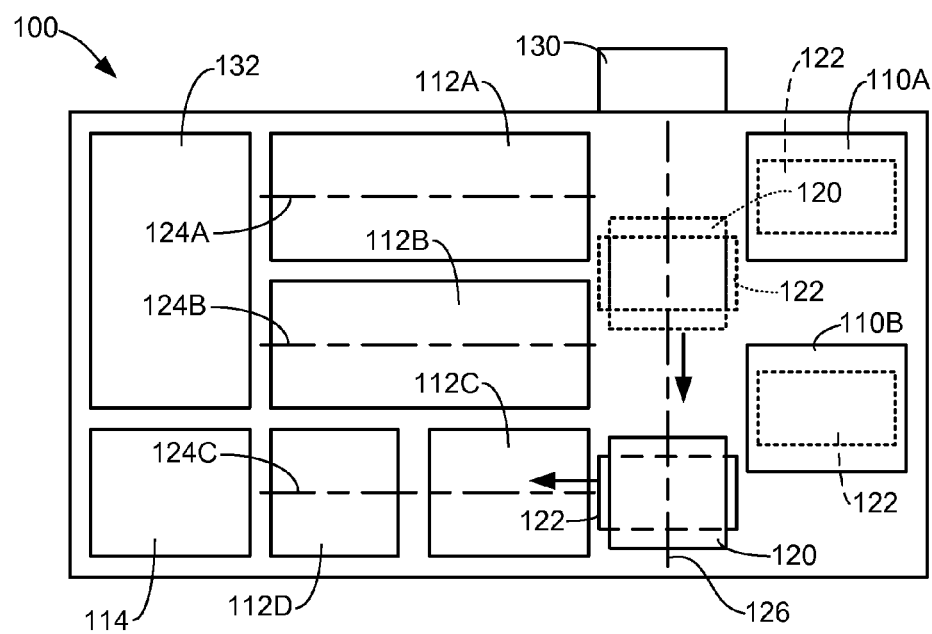
Figure 8:
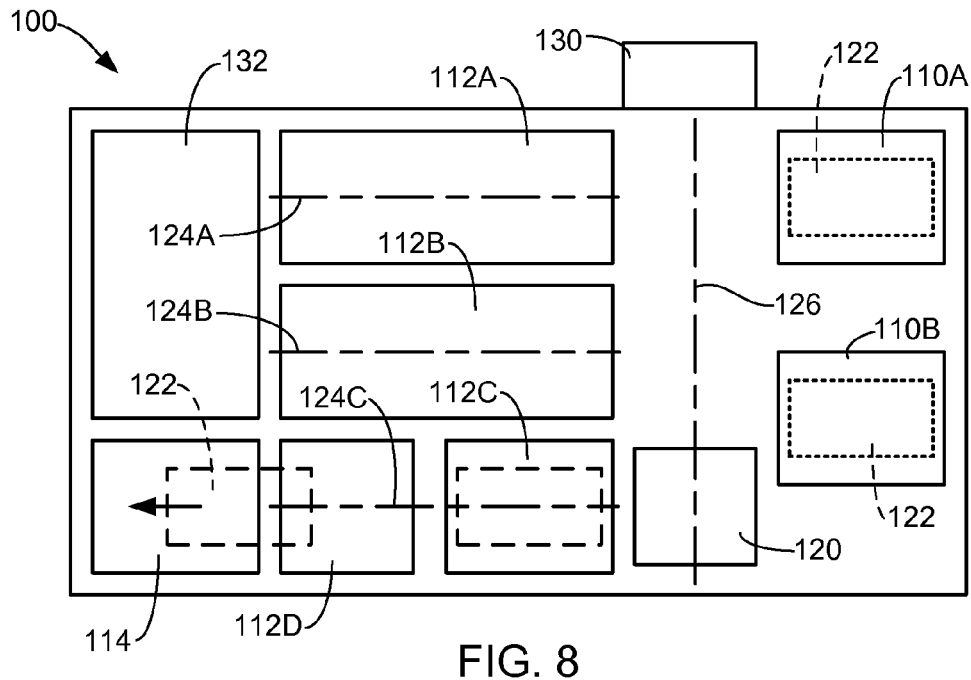

In accordance with one embodiment, after the processing of the substrate 122 by one of the devices 112, the substrate shuttle 120 delivers the substrate 122 to another processing device 112 for additional processing. In one example, the substrate shuttle 120 delivers the substrate 122 (illustrated in phantom lines) to the processing path 124C, as illustrated in FIG. 7. The substrate 122 is discharged from the substrate shuttle 120 along the processing path 124C and the substrate 122 is received by the processing device 112C for processing. When the processing device 112C is in the form of a printing device, an image may be printed on a first surface of the substrate 122. In one embodiment, the substrate 122 is then fed to the processing device 112D in the form of a substrate inverter, which flips the substrate 122 and presents the inverted substrate 122 back to the printing device 112C. The printing device 112C can then print an image to a second surface of the substrate 122. If the processing of the substrate 122 as defined by the credential job is complete, the substrate 122 may be discharged into the output hopper 114, such as along the processing path 124C, as shown in FIG. 8.

Figure 9:
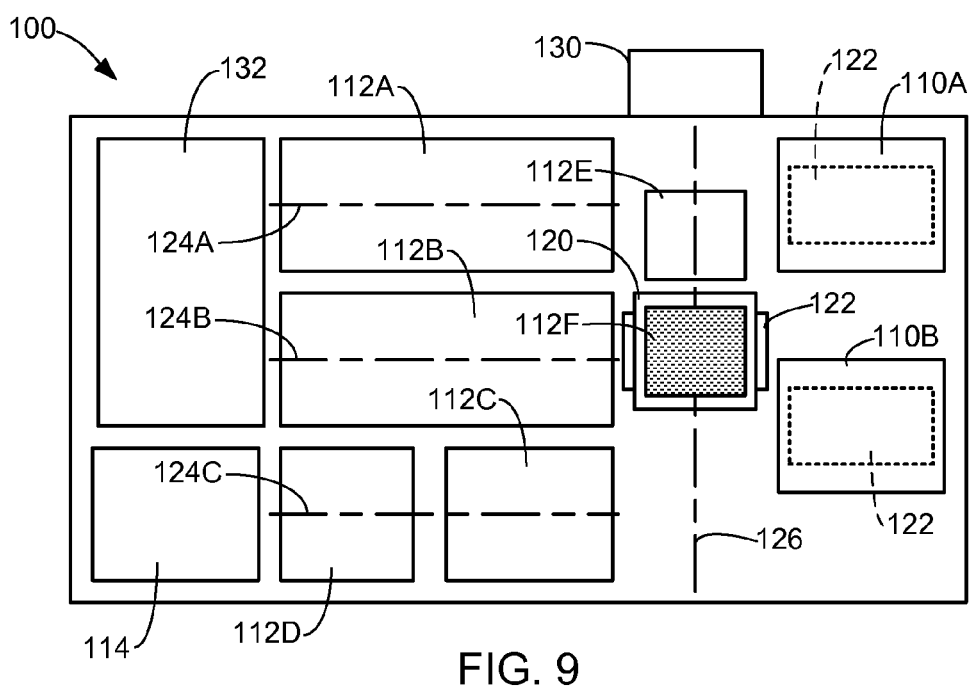

In addition to delivering individual substrates 122 to the processing devices 112 in the processing paths 124, the substrate shuttle 120 may also deliver individual substrates 122 to processing devices 112 located in the shuttle path 126, such as processing devices 112E and 112F. For instance, the substrate shuttle 120 may deliver an individual substrate 122 along the shuttle path 126 to a location that is proximate processing device 112F, as shown in FIG. 9. A suitable sensor, stepper motor count, or other technique may be used to align the substrate shuttle and the substrate 122 as desired with the processing device 112 in the path 126. Once properly positioned, the processing device 112F can perform a process, such as a RF data writing and/or reading operation on the substrate 122 contained in the substrate shuttle 120. Subsequent to this processing of the substrate 122, the shuttle 120 can deliver the substrate 122 to another location along the shuttle path 126, such as one of the processing paths 124 for further processing by one of the devices 112, or to a location where the substrate 122 may be discharged into an output hopper 114.

Figure 10:
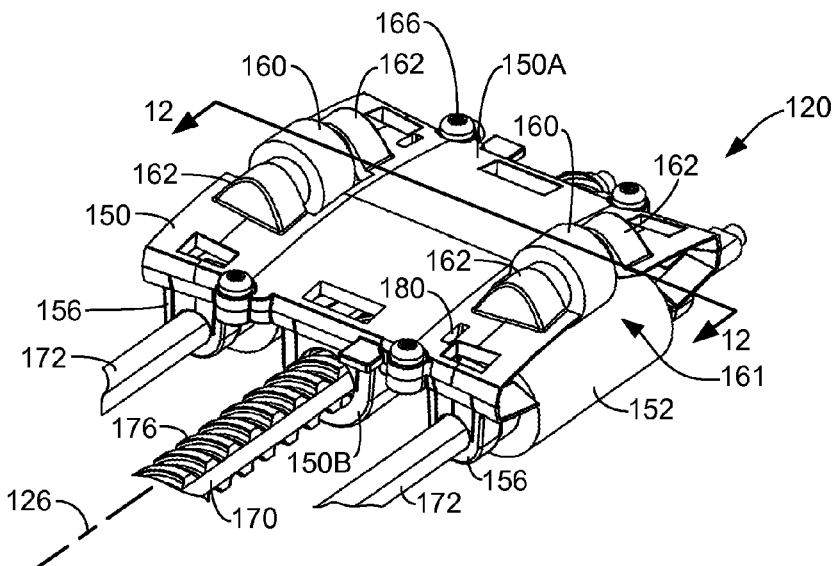
FIG. 10 is an isometric view of a substrate shuttle and components of a substrate drive formed in accordance with embodiments of the invention.
Figure 12:
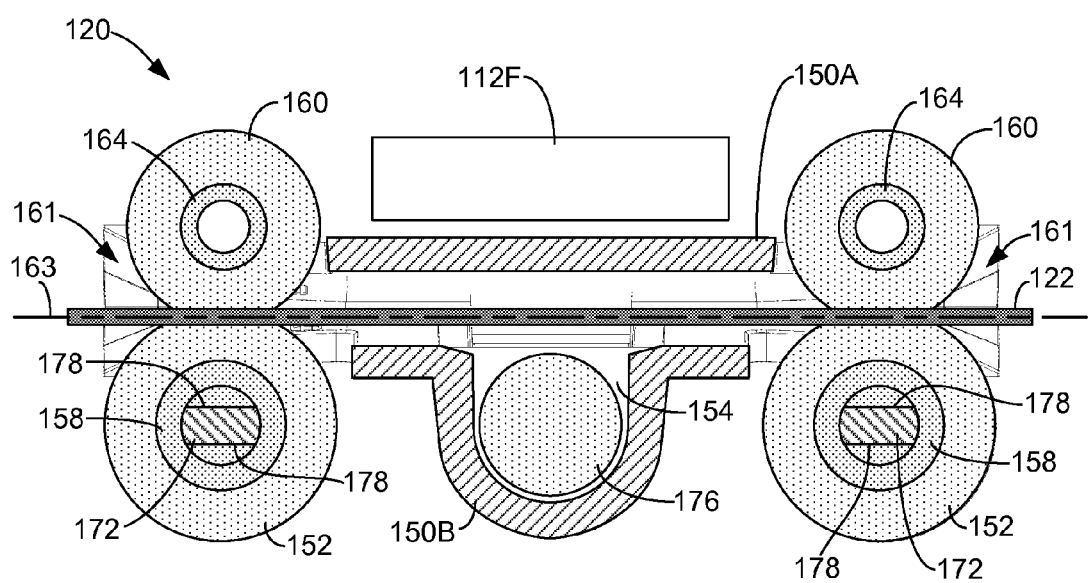
FIG. 12 is a side cross-sectional view of the substrate shuttle of FIG. 10 taken generally along the line 12-12.
Figure 11:
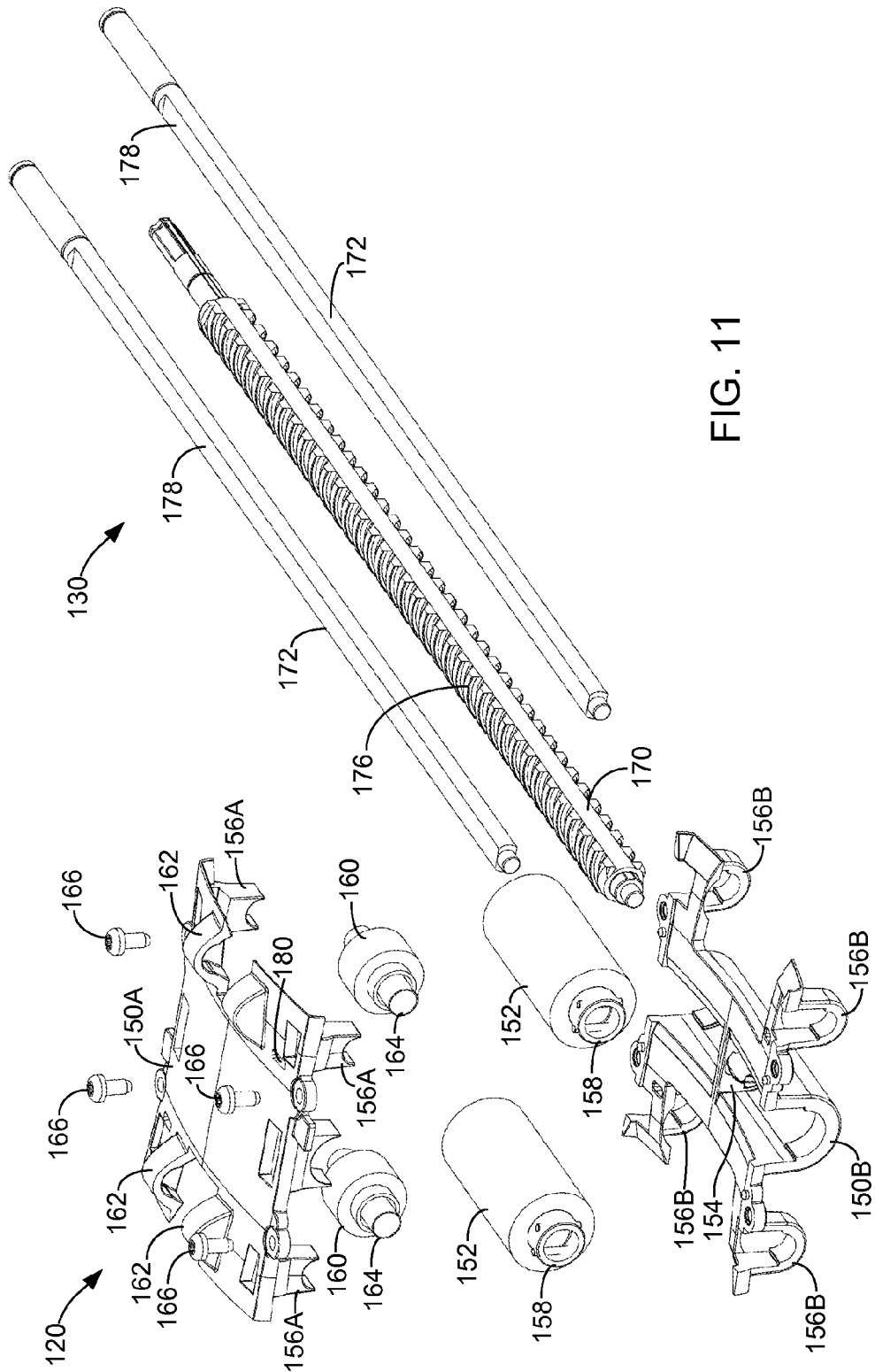
FIG. 11 is an exploded isometric view of the substrate shuttle of FIG. 10 and components of the shuttle drive.

Embodiments of the substrate shuttle 120 and the shuttle drive 130 will be described in greater detail with reference to FIGS. 10-12. FIG. 10 is an isometric view of a substrate shuttle 120 and components of the substrate drive 130 formed in accordance with embodiments of the invention. FIG. 11 is an exploded isometric view of the substrate shuttle 120 of FIG. 10 and components of the shuttle drive 130 in accordance with embodiments of the invention. FIG. 12 is a side cross-sectional view of the shuttle 120 of FIG. 10 taken generally along line 12-12.

One embodiment of the substrate shuttle 120 comprises a shuttle body 150, one or more substrate feed rollers 152 and a drive component 154. The shuttle body 150 is configured to provide support for the substrate feed rollers 152 and the drive component 154 and maintain their positions relative to each other. In one embodiment, the shuttle body 150 includes roller supports 156 that provide support for an axel or hub 158 of the feed rollers 152 and prevent the feed rollers 152 from moving relative to the shuttle body 150 in the direction of the shuttle path 126. In one embodiment, the shuttle body 150 includes an upper component 150A and a lower component 150B. In one embodiment, the component 150A includes an upper component 156A of the roller supports 156, and the component 150B includes a lower component 156B of the roller supports 156. The components 156A and 156B form the support 156 when the shuttle body components 150A and 150B are assembled.

In one embodiment, the shuttle 120 includes rollers 160, which cooperate with the feed rollers 152 to form pinch roller pairs 161. Individual substrates 122 are fed between the rollers 152 and 160 of each pair 161 as the substrate 122 is fed along the substrate path 163 into or out of the shuttle 120. In one embodiment, each roller 160 is supported for rotation about an axis that is generally parallel to the shuttle path 126 by supports 162 that receive ends of the axel 164 of the rollers 160. Retaining springs or other components may be used to secure the rollers 160 to the supports 162.

The shuttle 120 is assembled by initially positioning the ends of the hub 158 of the feed rollers 152 on the lower supports 156B of the shuttle body component 150B. The rollers 160 are then positioned in the supports 162 and the upper shuttle body component 150A is then positioned over the lower shuttle body 150B and the assembly is secured using screws 166 or other suitable technique.

One embodiment of the shuttle drive 130 comprises a screw 170 and one or more drive shafts 172, as shown in FIG. 11. The screw 170 is coupled to the motor 131 of the shuttle drive 130 through a gear 174 (FIG. 3), or other suitable arrangement. The screw 170 and drive shafts 172 are parallel to the shuttle path 126. The ends of the screw 170 and drive shafts 172 are supported for rotation about their longitudinal axes by the housing of the device 100.

In one embodiment, the drive component 154 of the shuttle 120 engages threads 176 of the screw 170. In one embodiment, the drive component 154 comprises a threaded bore or the equivalent thereto. Rotation of the screw 170 by the motor 131 drives movement of the shuttle 120 along the shuttle path 126 due to the engagement of the threads 176 with the drive component 154. The direction at which the shuttle 120 moves along the shuttle path 126 is determined based on the direction of rotation of the screw 170.

The shuttle drive 130 can position the shuttle 120 in the desired location along the shuttle path 126 using sensors or other suitable techniques. In one embodiment, as mentioned above, the motor 131 of the shuttle drive 130 is a stepper motor and the shuttle 120 can be positioned at any desired location along the shuttle path 126 relative to a home position in accordance with conventional stepper motor controlling techniques.

In one embodiment, the at least one drive shaft 172 extends through the hub 158 of one of the feed rollers 152, as shown in FIG. 12. Rotation of the drive shaft 172 may be driven by a substrate feed motor 177, shown schematically in FIG. 4. In one embodiment, the feed roller 152 rotates with rotation of the drive shaft 172 and the feed roller 152 is allowed to slide along the drive shaft 172, which is parallel to the shuttle path 126. In one embodiment, the hub 158 of the feed roller 152 has a non-circular cross-sectional shape that conforms to the shape of the drive shaft 172, as shown in FIG. 12. For example, the drive shaft 172 may include one or more flat surfaces 178 that correspond to flat surfaces within the hub 158. The non-circular shape of the shaft 172 and the hub 158 force the feed roller 152 to rotate with the drive shaft 172 while allowing the feed roller 152 to slide along the drive shaft 172 in the direction of the shuttle path 126.

In one embodiment, the shuttle drive 130 comprises two drive shafts 172, as illustrated in the figures. Each of the drive shafts 172 extends through one of the hubs 158 of the feed rollers 152 and operates as described above. Alternatively, the shuttle drive 130 may comprise a single drive shaft 172 that extends through the hub 158 of one of the feed rollers 152. A gear or belt arrangement can link the feed rollers 152 together such that the rotation of one of the feed rollers 152 by the drive shaft 172 also drives the rotation of the other feed roller 152.

In one embodiment, the substrate shuttle 120 has a low profile, as shown in FIG. 12. This low profile allows processing devices 112, such as device 112F, that are located above or below the shuttle path 126 to be placed in close proximity to a substrate 122 that is received within the shuttle 120, as illustrated schematically in FIG. 12. This facilitates the performance of RF reading and writing operations by the devices 112E or 112F. In one embodiment, the shuttle 120 does not include any electronic components, such as onboard motors or sensors. As a result, the shuttle 120 does not generate any electrical interference that could interfere with a RF data writing or reading operation on the substrate 122 supported by the shuttle 120.

Figure 13:
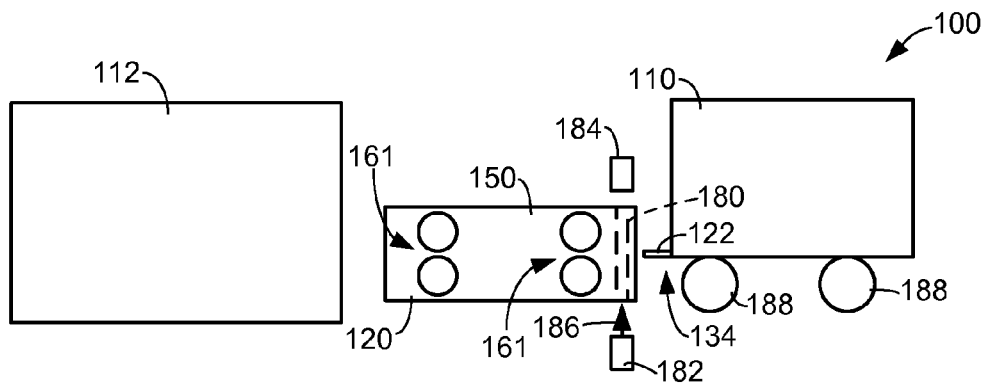
FIGS. 13-15 are simplified side views of a substrate shuttle, a hopper and a processing device in accordance with embodiments of the invention.
Figure 14:
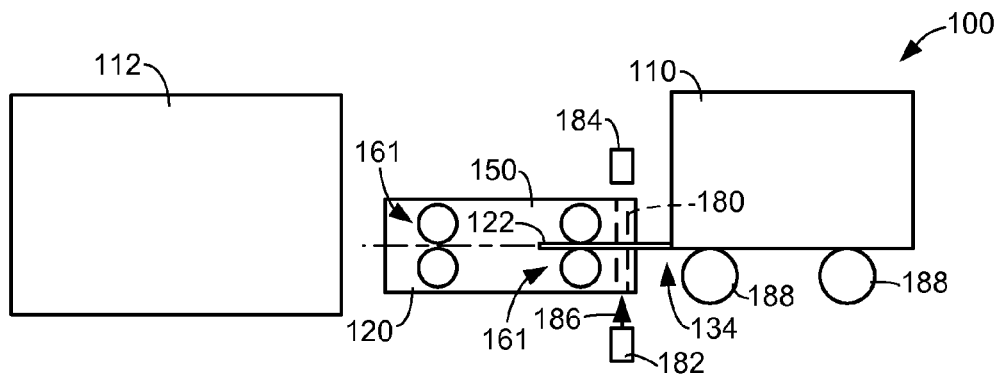
Figure 15:
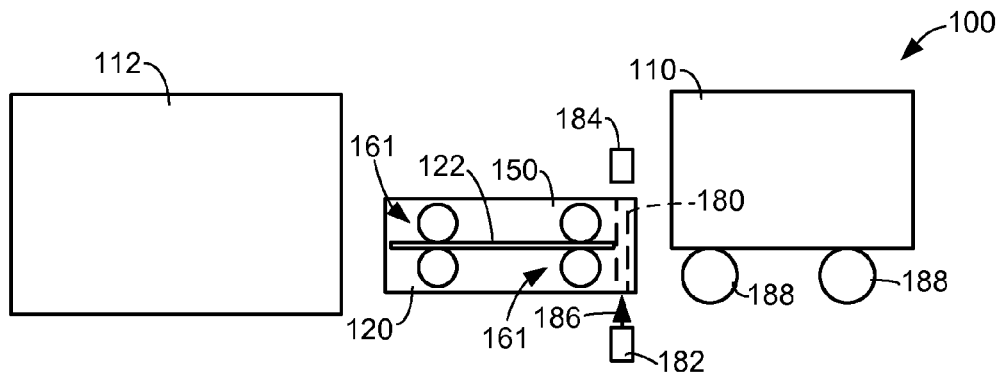

As mentioned above, sensors may be used to align the shuttle 120 with a desired location along the shuttle path 126, such as a location in which the shuttle 120 is aligned with one of the hoppers 110 and/or one of the processing paths 124, for example. In one embodiment, the shuttle body 150 comprises an opening 180 (FIG. 10) that is used in combination with an optical sensor to control the feeding of a substrate 122 into the shuttle 120. FIGS. 13-15 are simplified side views of the substrate shuttle 120, a hopper 110 and a processing device 112, in accordance with embodiments of the invention. The optical sensor includes an emitter 182 and a receiver 184 that are positioned on opposing sides of the shuttle 120. When the shuttle 120 is in the proper position along the shuttle path 126, light 186 transmitted by the emitter 182 passes through the opening 180 in the shuttle body 150 and is detected by the receiver 184. This can be used to indicate that the shuttle 120 is in a desired location relative to the hopper 110 along the shuttle path 126.

Once the shuttle 120 is properly aligned with the desired hopper 110, an individual substrate 122 may be fed out of the hopper 110 through the output port 134 toward the shuttle 120 using one or more feed rollers 188, as shown in FIG. 14. Initially, the receiver 184 detects light from the emitter 182 through the opening 180. As the substrate 122 is fed into the shuttle 120, the substrate 122 blocks the light beam, which is detected by the receiver 184. In one embodiment, the detection of the receipt of the substrate 122 by the blockage of the light beam by the receiver 184 can be used to trigger the rotation of the feed rollers 152 by the substrate feed motor 177 to pull the substrate 122 into the shuttle 120. As the substrate 122 is fed further into the shuttle 120, the trailing edge of the substrate 122 passes by the opening 180 thereby allowing the light signal from the emitter 182 to reach the receiver 184. The detection of the light signal by the receiver 184 provides notice to the controller 132 that the substrate 122 has been fully received within the shuttle 120, and the controller 132 stops the motor 177 driving the feed rollers 152. The substrate shuttle 120 is then ready to deliver the received substrate 122 to the desired location along the shuttle path 126.

Figure 16:
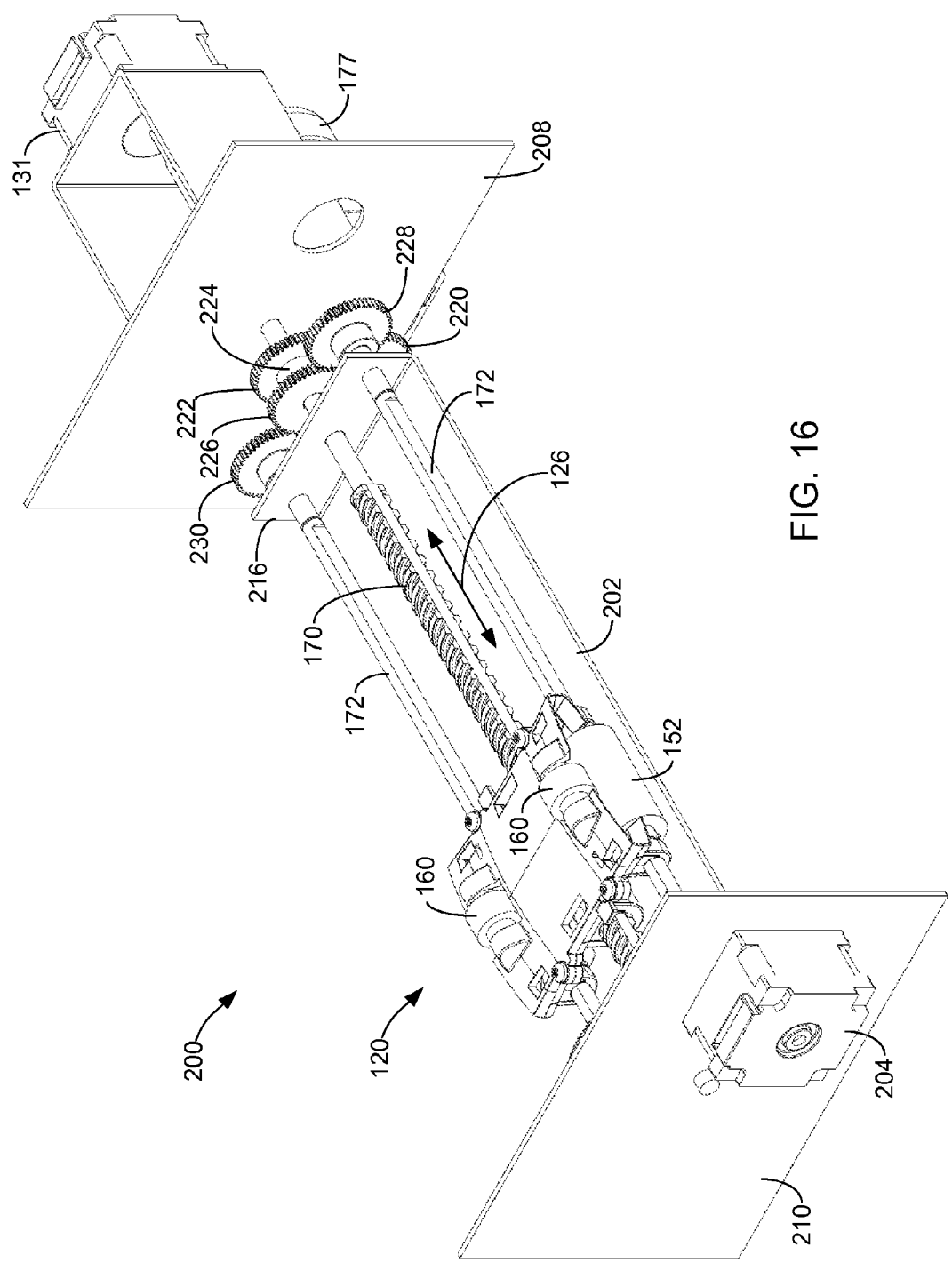
FIGS. 16 and 17 are isometric views of a shuttle rotator in accordance with embodiments of the invention.
Figure 17:
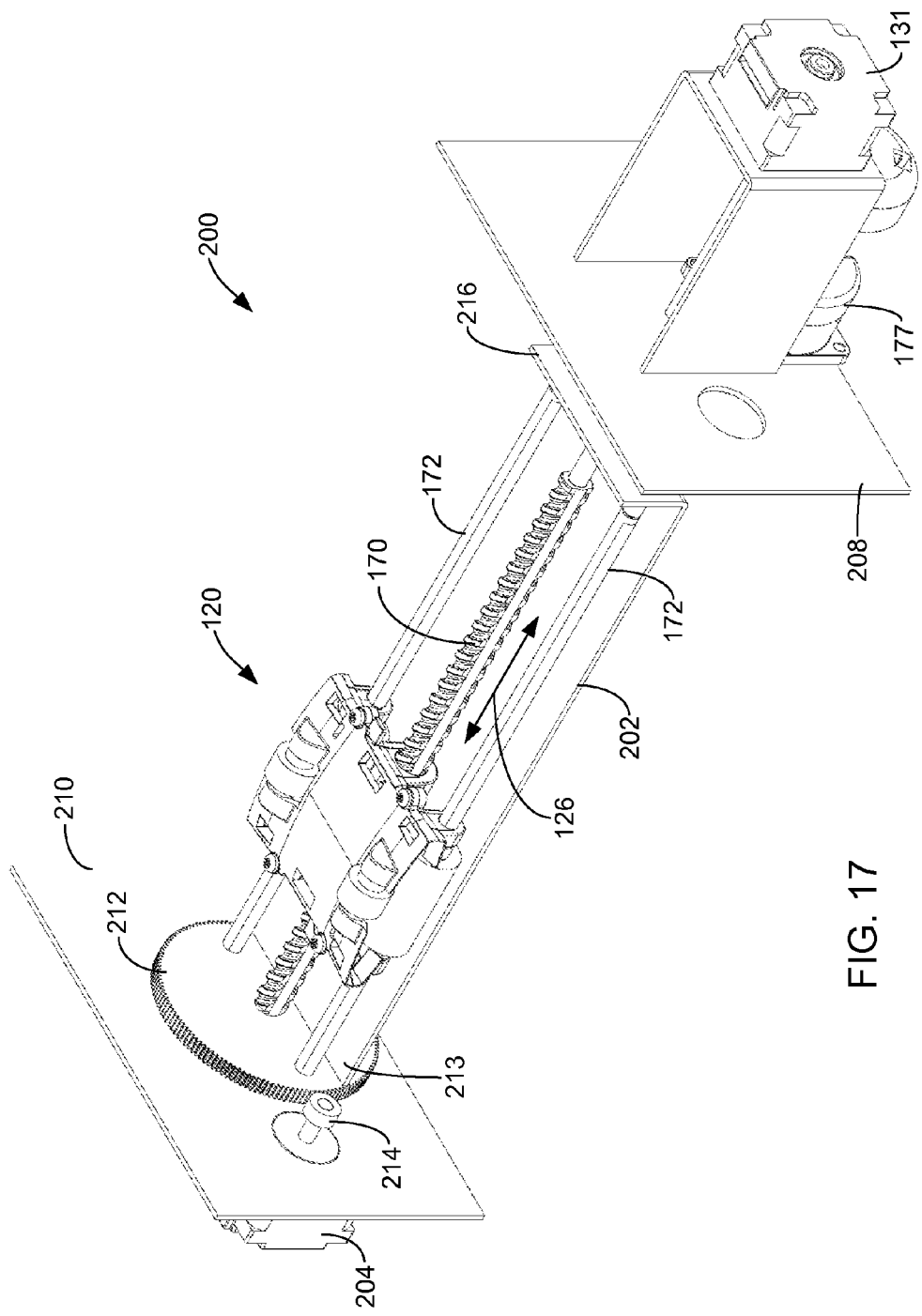
Figure 18:
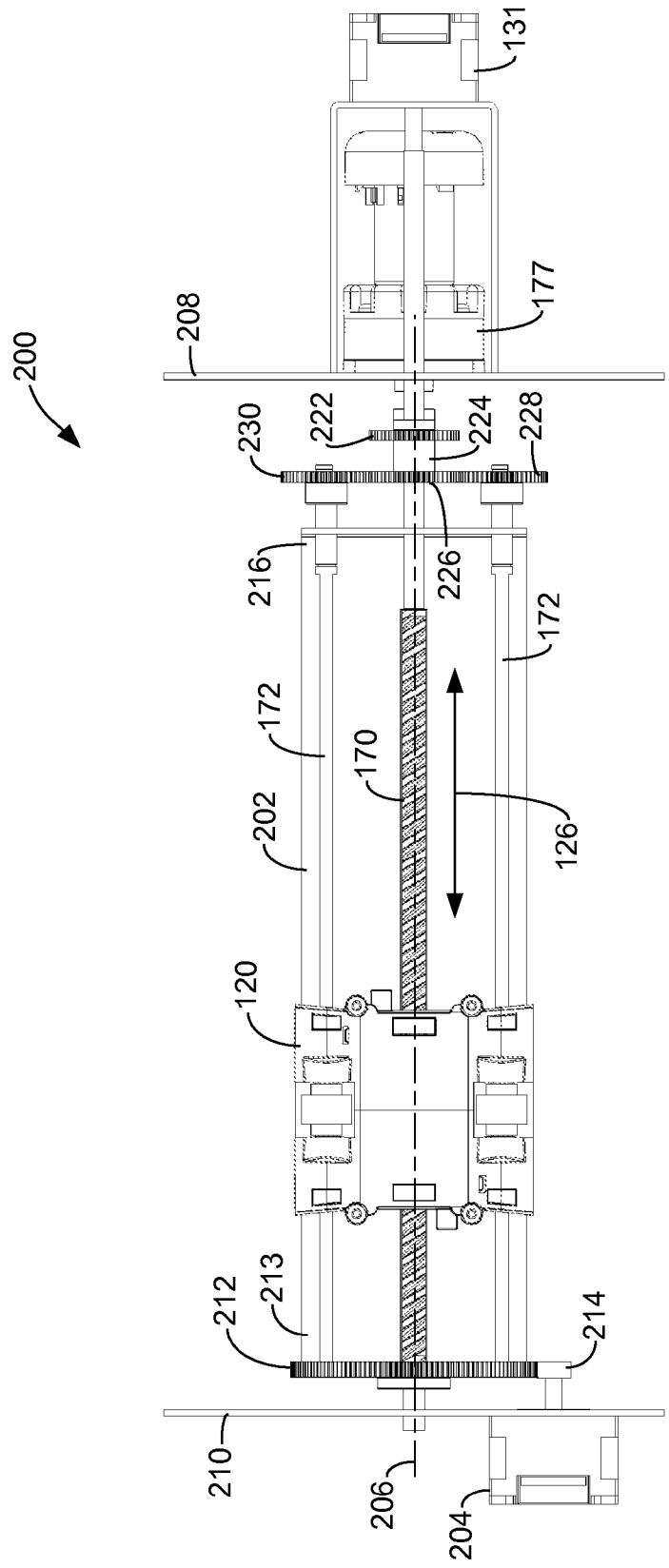
FIGS. 18 and 19 are top and side views, respectively, of the shuttle rotator illustrated in FIGS. 16 and 17.
Figure 19:
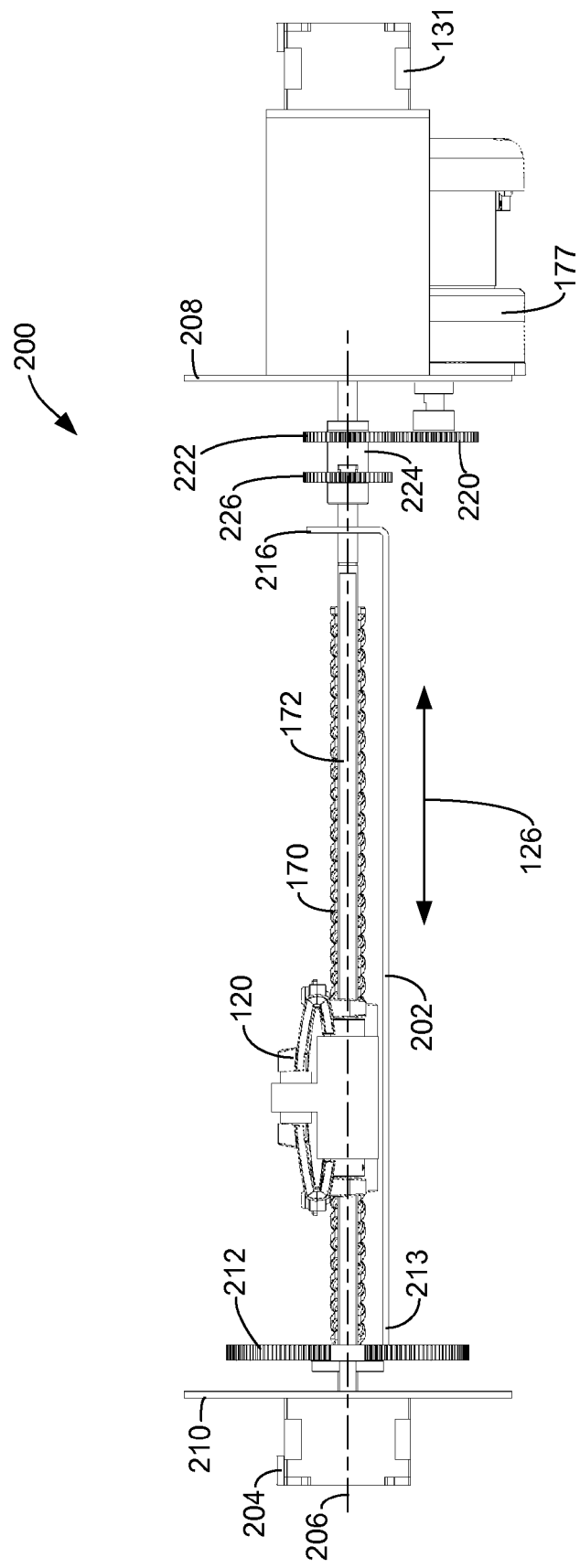

One embodiment of the credential manufacturing device 100 comprises a shuttle rotator 200 that is configured to rotate the substrate shuttle 120 and its substrate path 163 about an axis that is parallel to the shuttle path 126. FIGS. 16-19 depict a shuttle rotator 200 formed in accordance with embodiments of the invention. Elements of the credential manufacturing device 100, such as the processing devices 112 and the hoppers 110 are eliminated from the drawings in order to simplify the illustrations. FIGS. 16 and 17 are isometric views of the shuttle rotator 200 in accordance with embodiments of the invention. FIG. 18 is a top view of the shuttle rotator 200 in accordance with embodiments of the invention. FIG. 19 is a side view of the shuttle rotator 200 in accordance with embodiments of the invention.

In one embodiment, the shuttle rotator 200 includes a support member 202 and a motor 204. The motor 204 is configured to drive rotation of the support member 202 about a shuttle rotation axis 206, which is shown in FIGS. 18 and 19. In one embodiment, the substrate shuttle 120 rotates about the axis 206 responsive to rotation of the support member 202. In one embodiment, the shuttle rotation axis 206 is coaxial to the screw 170. In one embodiment, the support member 202 is supported for rotation about the axis 206 by sidewalls 208 and 210 of the credential manufacturing device 100.

In one embodiment, the support member 202 is attached to a gear 212 that is coaxial to the axis 206. The motor 204 drives rotation of the gear 212 and the attached support member 202 through a suitable gear arrangement, such as drive gear 214, shown in FIG. 17. The support member 202 is attached to the gear 212 at an end 213.

In one embodiment, the support member 202 includes an end wall 216, through which the screw 170 and the one or more drive shafts 172 extend. As mentioned above, one embodiment of the support member 202 rotates about the axis of the screw 170. In one embodiment, the drive shafts 172 rotate about the axis 206 with the rotation of the support member 202. In one embodiment, the drive shafts 172 maintain the ability to drive rotation of the feed rollers 152 throughout the various angular positions in which the shuttle 120 may be positioned in. In one embodiment, the substrate feed motor 177 maintains the ability to drive rotation of the shafts 172 as the support member 202 and the shuttle 120 are rotated about the axis 206. Also, the shuttle drive 130 can drive the substrate shuttle 120 along the shuttle path 126 through the rotation of the screw 170 by the motor 131 regardless of the angular position of the support 202 and the shuttle 120 relative to the sidewalls 208 and 210.

In one embodiment, the motor 177 drives rotation of a gear 220, which in turn drives the rotation of a gear 222, as shown in FIG. 19. The gear 222 is attached to a member 224 that is configured to rotate about the axis 206. In one embodiment, the member 224 is configured to rotate about the screw 170 responsive to rotation of the gear 222. In one embodiment, the member 224 is also attached to a gear 226. Rotation of the gear 222 by the motor 177 drives rotation of the member 224 and the gear 226. The gear 226 engages gears 228 and 230, which drive rotation of the shafts 172. As the support member 202, the shuttle 120 and the drive shafts 172 are rotated about the axis 206 and the screw 170, the gears 228 and 230 maintain engagement with the gear 226. As a result, the motor 177 may drive rotation of the drive shafts 172 regardless of the angular position of the support member 202, the drive shafts 172 and the shuttle 120 relative to the sidewalls 208 and 210.

As a result, the substrate rotator 202 can rotate the substrate shuttle 120 about the axis 206 while the shuttle 120 is driven along the shuttle path 126 by the shuttle drive 130. Additionally, a substrate 122 contained within the shuttle 120 may be fed from the shuttle 120 by the motor 177 along the substrate path 163 regardless of the angular position of the shuttle 120 about the axis 206 or the location of the shuttle 120 along the shuttle path 126.

The shuttle rotator 200 may be used to flip a substrate 122 contained within the substrate shuttle 120. Additionally, the shuttle rotator 200 may be used to orient a substrate 122 within the shuttle 120 in a desired angular position for feeding the substrate 122 to one or more processing devices that are not in the horizontal plane of the processing paths 124, for example. These embodiments are illustrated in the simplified diagrams provided in FIGS. 20A-D.

FIG. 20A illustrates the shuttle 120 that is oriented with a horizontal plane 240, with which the processing paths 124 and the hoppers 110 are aligned. That is, when the shuttle 120 is aligned with the horizontal plane 240, a substrate 122 may be received by the shuttle 120 from one of the hoppers 110, or a substrate 122 supported by the shuttle 120 may be fed along one of the processing devices 124, as discussed above with reference to FIGS. 4-8.

The shuttle 120 may be rotated by the shuttle rotator 200 about the axis 206 in either the clockwise, or counter clockwise direction to orient the shuttle 120 and the substrate path 163 with a desired plane 242 that is angularly displaced from the horizontal plane 240, as shown in FIG. 20B. The angular position of the substrate shuttle 120 may be set or detected using a stepper motor, sensors, or other suitable technique.

In one embodiment, the credential manufacturing device 100 includes one or more processing devices 243 that are oriented at different angular positions relative to the horizontal plane 240, such as devices 243 aligned with the plane 242 shown in FIG. 20B. Additionally, the devices 243 may also be displaced along the shuttle path 126. Embodiments of the devices 243 include those described above with regard to the processing devices 112. In one embodiment, the devices 243 are configured to perform a process on a substrate 122 supported by the shuttle 120. In accordance with another embodiment, the shuttle 120 is configured to feed the substrate 122 along the angularly displaced substrate path 163 and the plane 242 through the rotation of the feed rollers 152 by the motor 177 to deliver the substrate 122 to one of the processing devices 243 aligned with the plane 242 for processing.

The continued rotation of the shuttle 120 by the shuttle rotator 200 (FIG. 20C) ultimately inverts the card, as shown in FIG. 20D. As a result, the function performed by the card substrate rotator 112D may be performed by the shuttle rotator 200 thereby eliminating the need for the credential substrate rotator 112D. Accordingly, the surface 244 of the substrate 122 may initially be processed by one of the processing devices 112, such as by printing an image to the surface 244 using the printing device 112C. The processed substrate 122 can then be fed back into the shuttle 120, as shown in FIG. 20A. The shuttle rotator 200 can then proceed to rotate the shuttle 120 about the axis 206, as shown in FIGS. 20B and 20C. After the substrate shuttle has rotated 180 degrees relative to the horizontal plane 240 (FIG. 20D), the substrate 122 may be fed back to one of the processing devices 112 for processing of the surface 246. For instance, another image may be printed to the surface 246 by the printing device 112C. In this manner, both surfaces 244 and 246 may be processed by single-sided processing devices 112 through the rotation of the substrate 122 using the shuttle rotator 200.

Although the present invention has been described with reference to preferred embodiments, workers skilled in the art will recognize that changes may be made in form and detail without departing from the spirit and scope of the invention.

What is claimed is:

1. A credential manufacturing device comprising:
   a first hopper configured to contain a plurality of card substrates, the first hopper including an output port through which individual card substrates are discharged;
   a first processing path;
   a first processing device in the first processing path configured to perform a first process on individual card substrates in the first processing path;

a substrate shuttle positioned between the first hopper and the first processing path and configured to move relative to the first hopper and the first processing path along a horizontal shuttle path that is transverse to the first processing path, the shuttle configured to receive individual card substrates from the output port of the first hopper, transport received card substrates along the shuttle path, and deliver received card substrates to the first processing path;

a shuttle drive configured to drive movement of the substrate shuttle along the shuttle path; and a second processing device positioned adjacent the shuttle path and configured to perform a process on individual card substrates supported in the substrate shuttle.

2. The device of claim 1, wherein the substrate shuttle does not support electronic components selected from the group consisting of a motor and a sensor.

3. The device of claim 1, wherein:
the substrate shuttle comprises a drive component;
the shuttle drive comprises a screw that is aligned with the shuttle path and engages the drive component, and a shuttle transport motor that is located externally to the substrate shuttle and is configured to drive rotation of the screw; and
the substrate shuttle is driven along the screw and the shuttle path responsive to rotation of the screw.

4. The device of claim 1, wherein:
the substrate shuttle comprises substrate feed rollers supported on the substrate shuttle for rotation about an axis that is substantially parallel to the shuttle path; and
the shuttle drive comprises a substrate feed motor located externally to the substrate shuttle, the substrate feed motor configured to drive rotation of at least one of the substrate feed rollers.

5. The device of claim 4, wherein:
the shuttle drive includes a drive shaft extending substantially parallel to the shuttle path;
at least one of the feed rollers is linked to the drive shaft; and
the substrate feed motor is configured to drive rotation of the drive shaft and the linked feed roller, and drive individual substrates along a substrate path that extends substantially parallel to the first processing path and through the substrate shuttle.

6. The device of claim 5, wherein the substrate shuttle comprises a hub that receives the drive shaft, slides along the drive shaft responsive to movement of the substrate shuttle along the shuttle path, rotates with rotation of the drive shaft, and links the drive shaft to the at least one feed roller.

7. The device of claim 5, further comprising a shuttle rotator comprising:
a support member configured to rotate about the screw; and
a motor configured to drive the rotation of the support member about the screw;
wherein rotation of the support member about the screw drives rotation of the substrate shuttle and the drive shaft about the screw.

8. The device of claim 1, wherein:
the device further comprises:
a second processing path extending substantially parallel to the first processing path and displaced from the first processing path along the shuttle path; and
a third processing device in the second processing path configured to perform a second process on individual card substrates in the second processing path;
the shuttle path is between the second processing path and the first hopper; and the substrate shuttle is configured to deliver individual card substrates to the second processing path.

9. The device of claim 1, wherein:
the device further comprises a second hopper displaced from the first hopper along the shuttle path, the second hopper configured to contain a plurality of card substrates, the second hopper including an output port through which individual card substrates are discharged toward the shuttle path; and
the substrate shuttle is configured to receive individual substrates discharged through the output port of the second hopper.

10. The device of claim 1, wherein the second processing device comprises a radio frequency (RF) data writer positioned adjacent the shuttle path, and configured to perform a data read or write operation on an individual card substrate supported within the substrate shuttle.

11. The device of claim 1, further comprising a shuttle rotator comprising:
a support member configured to rotate about a shuttle rotation axis that is parallel to the shuttle path; and
a motor configured to drive the rotation of the support member about the shuttle rotation axis;
wherein the substrate shuttle rotates about the shuttle rotation axis responsive to rotation of the support member.

12. The device of claim 1, wherein:
the second processing device is positioned above or below the shuttle path and between the plurality of hoppers and the first processing device; and
the shuttle moves along the shuttle path relative to the second processing device.

13. A credential manufacturing device comprising:
a plurality of hoppers each configured to contain a plurality of card substrates and including an output port through which individual card substrates are discharged;
a plurality of processing paths, each processing path extends substantially parallel to the other processing paths and is displaced from the other processing paths along a horizontal shuttle path that is transverse to the processing paths;
a plurality of first processing devices, each first processing device located in one of the processing paths and configured to perform a process on individual card substrates in the corresponding processing path;
a substrate shuttle positioned between the hoppers and the processing paths and configured to receive individual card substrates from the output ports of the hoppers, transport received card substrates along the shuttle path, and deliver received card substrates to the processing paths;
a shuttle drive configured to drive movement of the substrate shuttle along the shuttle path; and
at least one second processing device positioned adjacent the shuttle path and configured to perform a process on individual card substrates supported in the substrate shuttle.

14. The device of claim 13, wherein the substrate shuttle does not include electronic components select from the group consisting of a motor and a sensor.

15. The device of claim 13, wherein:
the substrate shuttle comprises a drive component;
the shuttle drive comprises a screw that is aligned with the shuttle path and engages the drive component, and a shuttle transport motor configured to drive rotation of the screw; and
the substrate shuttle is driven along the screw and the shuttle path responsive to rotation of the screw.

16. The device of claim 13, wherein:
the substrate shuttle comprises substrate feed rollers supported on the substrate shuttle for rotation about an axis that is substantially parallel to the shuttle path; and
the shuttle drive comprises a substrate feed motor located externally to the substrate shuttle, the substrate feed motor configured to drive rotation of at least one of the feed rollers.

17. The device of claim 16, wherein:
the shuttle drive includes a drive shaft extending substantially parallel to the shuttle path;
at least one of the feed rollers is linked to the drive shaft; and
the substrate feed motor is configured to drive rotation of the drive shaft and the linked feed roller, and drive individual substrates along a substrate path that extends substantially parallel to the processing paths and through the substrate shuttle.

18. The device of claim 17, wherein the substrate shuttle comprises a hub that receives the drive shaft, slides along the drive shaft responsive to movement of the substrate shuttle along the shuttle path, rotates with rotation of the drive shaft, and links the drive shaft to the at least one feed roller.

19. The device of claim 13, wherein the plurality of first processing devices are each selected from the group consisting of a print head, a transfer roller, a laminating head, a card substrate inverter, a data reader, and a data writer.

20. The device of claim 13, wherein the at least one second processing device includes a radio frequency (RF) data writer configured to perform a data read or write operation on an individual card substrate supported within the substrate shuttle and positioned along the shuttle path adjacent the RF data writer.

21. The device of claim 13, wherein:
the at least one second processing device is positioned above or below the shuttle path and between the plurality of hoppers and the plurality first processing devices; and
the shuttle moves along the shuttle path relative to the at least one second processing device.

22. A credential manufacturing device comprising:
a first hopper configured to contain a plurality of card substrates, the first hopper including an output port through which individual card substrates are discharged;
a first processing path;
a first processing device in the first processing path configured to perform a first process on individual card substrates in the first processing path;
a substrate shuttle configured to move relative to the first hopper and the first processing path along a horizontal shuttle path that is transverse to the first processing path, and receive individual card substrates from the output port of the first hopper, transport received card substrates along the shuttle path, and deliver received card substrates to the first processing path, the substrate shuttle comprising substrate feed rollers supported for rotation about an axis that is substantially parallel to the shuttle path; and
a shuttle drive configured to drive movement of the substrate shuttle along the shuttle path, wherein the shuttle drive comprises a substrate feed motor located externally to the substrate shuttle, the substrate feed motor configured to drive rotation of at least one of the substrate feed rollers.

23. A credential manufacturing device comprising:
a first hopper configured to contain a plurality of card substrates, the first hopper including an output port through which individual card substrates are discharged;
a first processing path;
a first processing device in the first processing path configured to perform a first process on individual card substrates in the first processing path;
a substrate shuttle configured to move relative to the first hopper and the first processing path along a horizontal shuttle path that is transverse to the first processing path, and receive individual card substrates from the output port of the first hopper, transport received card substrates along the shuttle path, and deliver received card substrates to the first processing path;
a shuttle drive configured to drive movement of the substrate shuttle along the shuttle path; and
a radio frequency (RF) data writer positioned adjacent the shuttle path, wherein the RF data writer is configured to perform a data read or write operation on an individual card substrate supported within the substrate shuttle and positioned along the shuttle path adjacent the RF data writer.

24. The device of claim 23, wherein:
the substrate shuttle comprises substrate feed rollers supported on the substrate shuttle for rotation about an axis that is substantially parallel to the shuttle path; and
the shuttle drive comprises a substrate feed motor located externally to the substrate shuttle, the substrate feed motor configured to drive rotation of at least one of the substrate feed rollers.

25. A credential manufacturing device comprising:
a first hopper configured to contain a plurality of card substrates, the first hopper including an output port through which individual card substrates are discharged;
a first processing path;
a first processing device in the first processing path configured to perform a first process on individual card substrates in the first processing path;
a substrate shuttle configured to move relative to the first hopper and the first processing path along a horizontal shuttle path that is transverse to the first processing path, the shuttle configured to receive individual card substrates from the output port of the first hopper, transport received card substrates along the shuttle path, and deliver received card substrates to the first processing path;
a shuttle drive configured to drive movement of the substrate shuttle along the shuttle path; and
a shuttle rotator comprising:
a support member configured to rotate about a shuttle rotation axis that is parallel to the shuttle path; and
a motor configured to drive the rotation of the support member about the shuttle rotation axis;
wherein the substrate shuttle rotates about the shuttle rotation axis responsive to rotation of the support member.

* * * * *